POTENTIAL WAVE-GENERATING SYSTEMS

Filed March 28, 1952 3 Sheets-Sheet 1

INVENTOR.
GEORGE B. TOWNSEND
BY Laurence B. Dodds
ATTORNEY

POTENTIAL WAVE-GENERATING SYSTEMS

Filed March 28, 1952 3 Sheets-Sheet 2

*INVENTOR.*
GEORGE B. TOWNSEND
*BY* Laurence B. Dodds
ATTORNEY

Feb. 21, 1956 G. B. TOWNSEND 2,735,938

POTENTIAL WAVE-GENERATING SYSTEMS

Filed March 28, 1952 3 Sheets-Sheet 3

INVENTOR.
GEORGE B. TOWNSEND

BY Laurence B. Dodds

ATTORNEY

United States Patent Office 2,735,938
Patented Feb. 21, 1956

2,735,938

POTENTIAL WAVE-GENERATING SYSTEMS

George B. Townsend, Wembley, England, assignor to Hazeltine Research, Inc., Chicago, Ill., a corporation of Illinois Application March 28, 1952, Serial No. 278,994
Claims priority, application Great Britain April 10, 1951
18 Claims. (Cl. 250—36)

*General*

Figure 1:
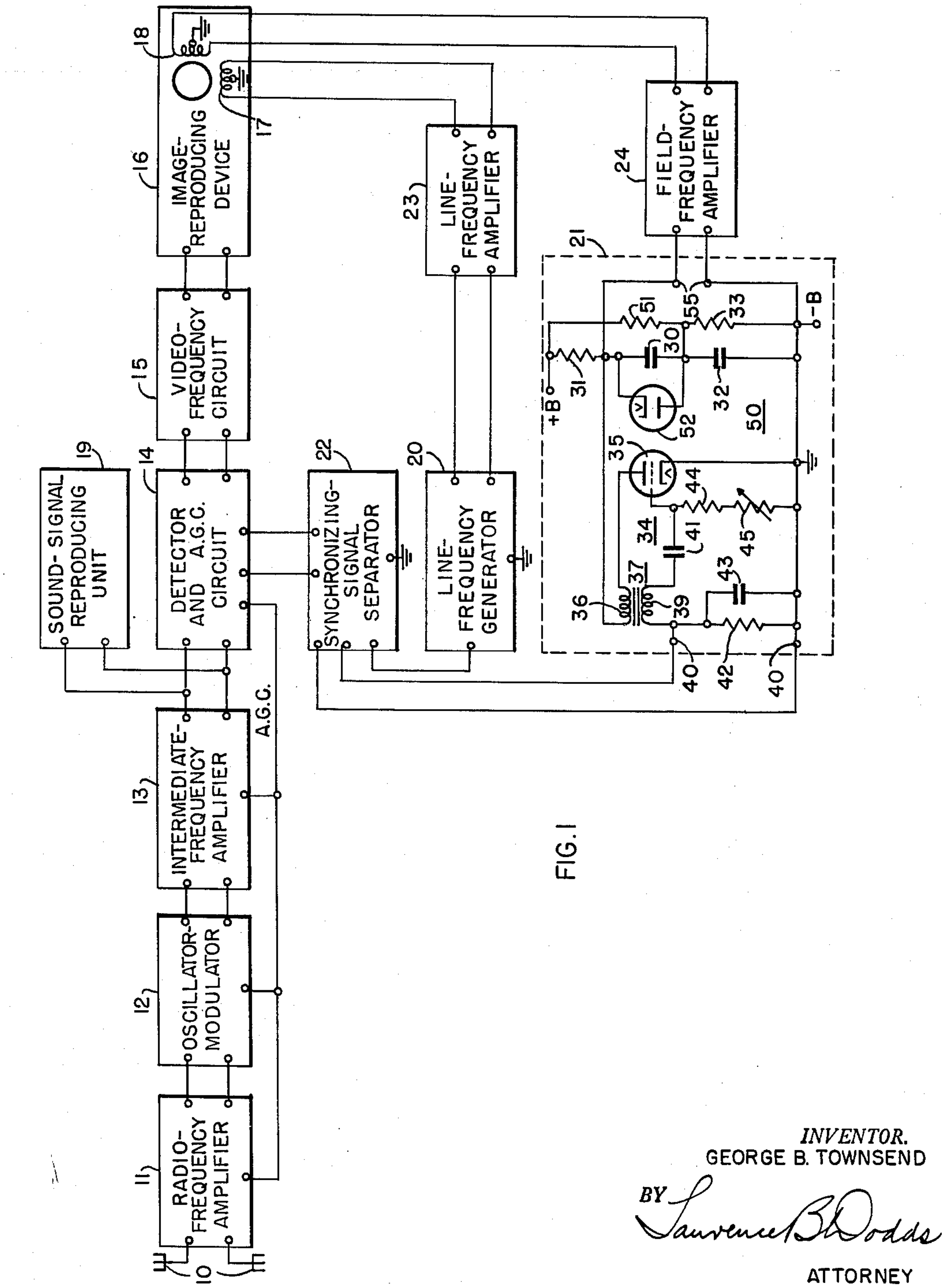

The present invention is directed to potential wave-generating systems for developing a wave having retrace portions and trace portions long relative to the retrace portions and, specifically, to such systems for developing the saw-tooth deflection potentials for controlling the deflection of the electron beam of a picture tube in a television receiver. Though the invention is subject to a wide variety of applications, it is especially useful in television receivers and will be described in that environment.

In a conventional television system there is developed and transmitted at a transmitter a signal which comprises a carrier-wave signal modulated during successive intervals or trace periods by video-frequency components representative of the light and shade values of an image being televised. During retrace intervals between the trace periods, the carrier is modulated by synchronizing pulses which correspond to the initiations of successive lines and fields in the scanning of the image. At the receiver, an image-reproducing device including a picture or cathode-ray tube is utilized and the picture and synchronizing signals derived from the transmitted carrier-wave signal are applied thereto to reproduce the televised image. The picture signals are applied as intensity control signals to the electron beam of the cathode-ray tube while the synchronizing pulses are utilized to develop deflection signals which are applied to deflection circuits of the image-reproducing device to cause the electron beam of the cathode-ray tube in the device to trace a rectilinear raster on an image screen. This raster is illuminated in a series of fields of parallel lines by the electron beam, the intensity variations thereof developing the reproduced image.

In a receiver of the type just described, in order to effect the rectilinear scanning of the image screen of the cathode-ray tube by the electron beam, saw-tooth current or voltage waves are developed by line-frequency and field-frequency generators at the receiver and utilized to produce, respectively, electromagnetic or electrostatic fields the variations in intensity with time of which are of saw-tooth wave form which deflect the cathode-ray beam in two directions normal to each other for line- and field-frequency scanning, thereby to trace the rectilinear raster upon the image screen of the tube. The transmitted synchronizing pulses after being derived in the receiver are generally utilized to control the operation of these generators, thereby to synchronize the scanning action of the electron beam with respect to the received signal.

It is important that the synchronization be accomplished with a high degree of precision in order that an image of high quality be reproduced. This is especially true with respect to the synchronization of the field-frequency generator in scanning systems of the interlaced type where the field frequency is not an integral submultiple of the line frequency so that the lines of one field interlace or fall between the lines of a preceding field and a plurality of succesive fields thus constitute a single frame or a single complete image. To obtain a precisely inter-laced relations between the successive fields, it is especially important that the field-trace periods be initiated at precisely related intervals, at precisely related points on the image screen and that the deflection magnitude during the field-trace periods be constant. In order to obtain the utmost benefit from interlacing of the fields, it is important that the lines on the raster of one field fall midway between the lines on the raster of the preceding field and that the relative positions of the lines of the two fields not deviate from the midway relationship by more than a small percentage of the separation of two consecutive lines of the same field. In order to maintain this precise relationship, it is important that the amplitude of the retrace portion of the field-frequency saw-tooth wave signal be constant, otherwise, since the retrace portion of such signal controls the movement of the electron beam in the picture tube from the termination of the trace of one field to the point of initiation of the trace of the next field, any deviation of such retrace portion from constant amplitude will cause the initiation of the trace of the second field to be improperly positioned with respect to the lines of the preceding field. It has been found that the amplitude of such retrace portion of the field-frequency saw-tooth wave signal should not vary by a factor of more than one part in approximately twenty-five hundred. In other words, if an interleaved line is not to vary from mid-position between two adjacent lines by more than ten per cent. of the space between such lines and the space therebetween is 1/250 of the total space in a field having approximately 250 lines, the permitted variation in amplitude should not be more than 1/10 x 1/250 or 1/2500. Such precision is relatively high for a commercially produced receiver designed for mass production.

In order to effect field synchronization, it is conventional practice to synchronize the field-frequency generator at the termination of each trace portion of the field-frequency saw-tooth potential wave or, in other words, at the initiation of each retrace portion of such wave. This is accomplished by applying synchronizing pulses to the field-frequency generator so as to trigger the operation thereof at these points. Such synchronizing normally controls the initiation of the retrace portion to within an acceptable degree of accuracy but has no control over the termination of the retrace portion of the wave. Since variations in the energy content of the pulses applied to the field-frequency generator may cause the retrace portion of the saw-tooth potential wave to have variations in slope or in duration which effectively vary the amplitude thereof, one field of trace may not be properly positioned with respect to the preceding or succeeding fields of trace for the reasons presented above. Therefore, it is desirable that not only the initiation of the retrace portions of the field-frequency saw-tooth potential wave be controlled as is now accomplished but also that the amplitude of such portions be maintained constant by controlling the termination thereof. The present invention is directed to a potential wave-generating system for effecting such result.

It is an object, therefore, of the present invention to provide a new and improved potential wave-generating system which avoids the above-mentioned deficiencies of prior such systems.

It is another object of the present invention to provide a new and improved potential wave-generating system in which both the initiation and the termination of the retrace portions of a saw-tooth potential wave are controlled.

It is a still further object of the present invention to provide a new and improved potential wave-generating system in which the retrace portions of a saw-tooth potential wave have substantially constant amplitude.

It is an additional object of the present invention to provide a new and improved potential wave-generating system for developing field-frequency saw-tooth potential waves in a television receiver utilizing interlaced scanning in which the interlacing is substantially improved.

It is a still additional object of the present invention to provide a new and improved potential wave-generating system for developing field-frequency saw-tooth potential waves in a television receiver utilizing interlaced scanning in which the retrace portions of the saw-tooth wave are maintained constant in amplitude to effect improved interlacing.

In accordance with the present invention, a system for generating a television scanning potential wave having retrace portions and trace portions long relative to the retrace portions comprises energy-storage means including a pair of terminals and a charging circuit for supplying energy to the storage means to develop on one of the aforesaid terminals with respect to the other thereof the trace portions of the wave. This system also includes a circuit for periodically discharging the storage means to develop on the aforesaid one terminal with respect to the aforesaid other terminal the retrace portions of the wave, the amplitudes of the retrace portions tending to vary with variations in the operating conditions of the discharge circuit. Additionally, the system includes a control circuit for causing the retrace portions to be terminated at a constant termination potential including a source of fixed reference potential substantially equal to the termination potential and a unidirectionally conductive device coupled between the source and the aforesaid one terminal of the energy-storage means for preventing the termination potential on the one terminal from decreasing below the fixed potential.

As used above and hereinafter, the terms "charging" and "discharging" may be considered to be interchangeable terms indicating opposing actions. These terms refer to the changing of the energy level of an energy-storage means from one level to another, the term "charge" referring to such a change in one sense, for example, from a negative to a positive level while the term "discharge" refers to a change in the opposite sense, for example, from a positive to a negative level.

For a better understanding of the present invention, together with other and further objects thereof, reference is had to the following description taken in connection with the accompanying drawings, and its scope will be pointed out in the appended claims.

Figure 2A:
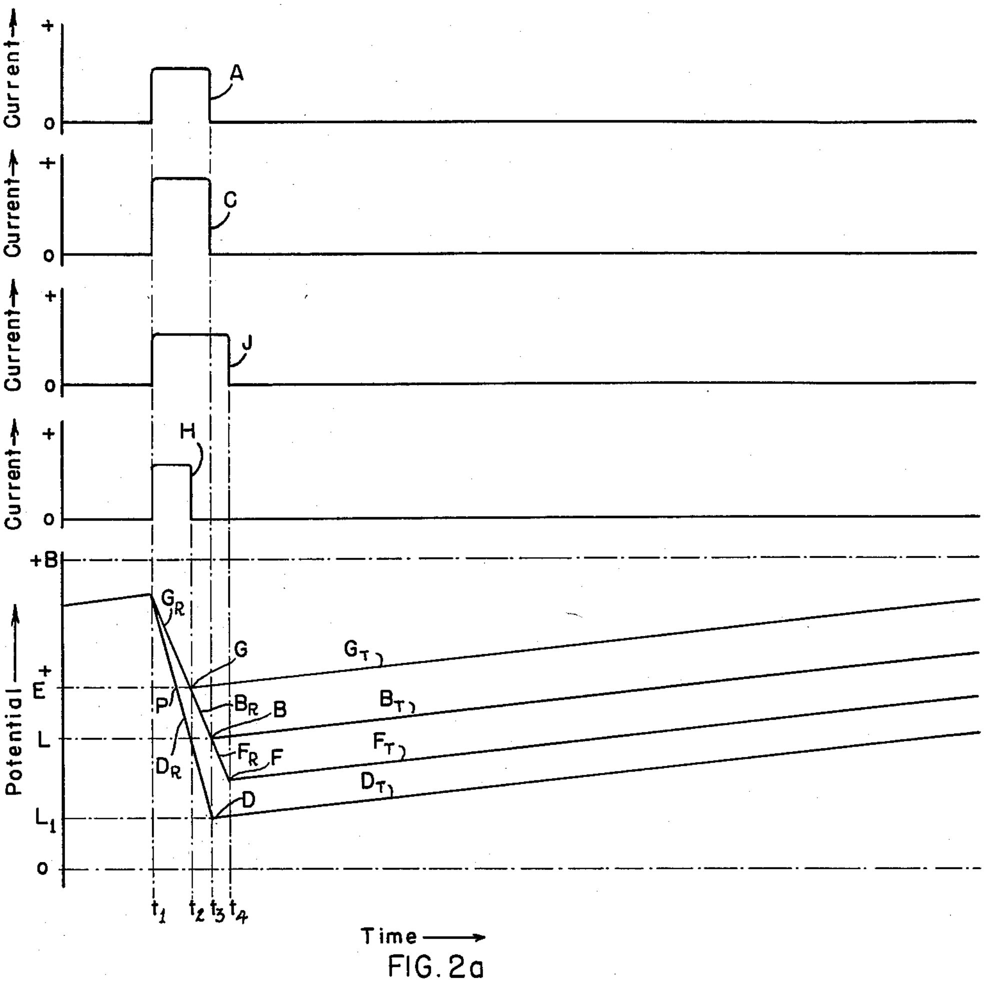
Figure 2B:
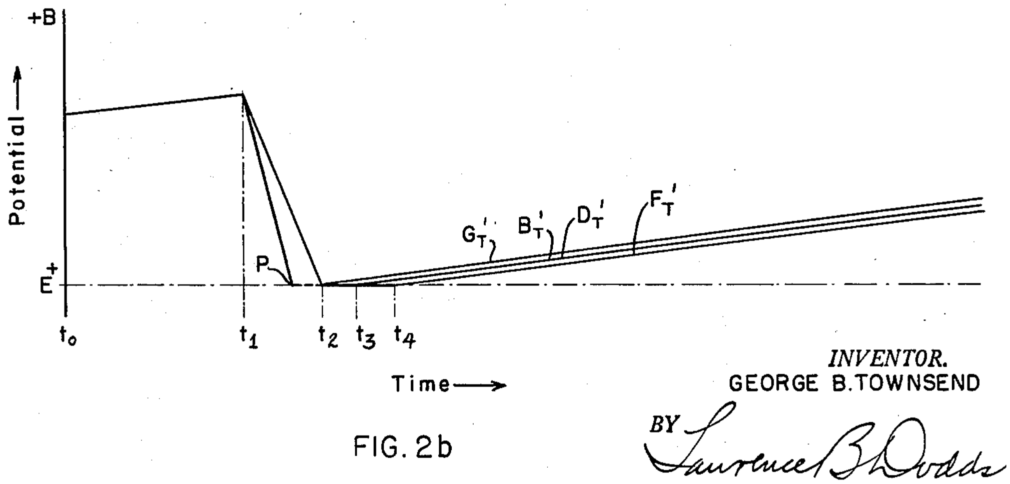
Figure 3A:
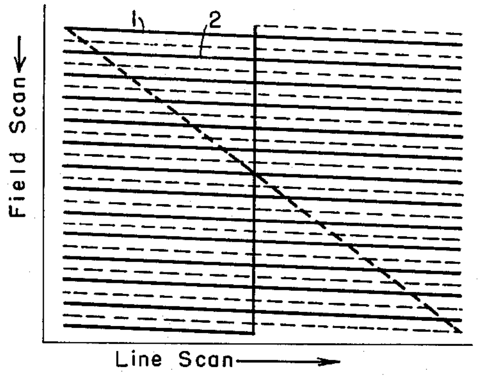
Figure 3B:
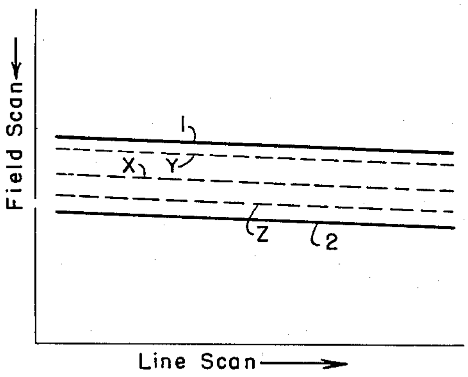
Figure 4:
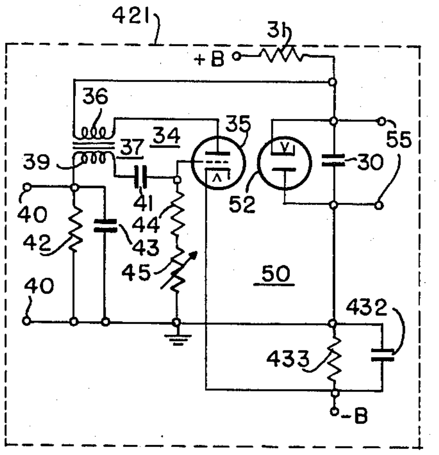
Figure 5:
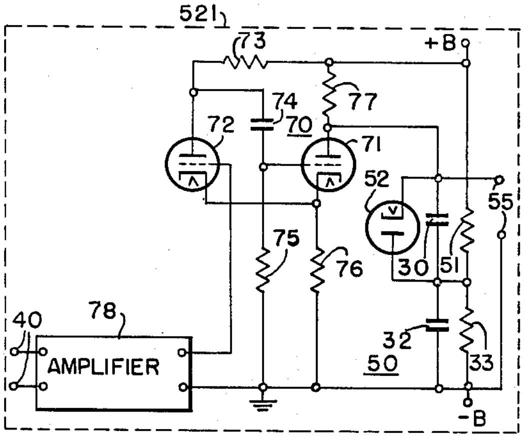

In the drawings, Fig. 1 is a circuit diagram of a complete television receiver including a potential wave generator in accordance with the present invention; Figs. 2*a* and 2*b* are groups of curves and Figs. 3*a* and 3*b* are image-reproducing patterns or rasters useful in explaining the operation of the generator of Fig. 1; and Figs. 4 and 5 are modified forms of the generator of Fig. 1.

*General description of Fig. 1 receiver*

Referring now more particularly to Fig. 1 of the drawings, the television receiver there represented is of the superheterodyne type including an antenna system 10, 10 coupled to a radio-frequency amplifier 11 of one or more stages. There is coupled to the unit 11, in cascade, in the order named, an oscillator-modulator 12, an intermediate-frequency amplifier 13 of one or more stages, a detector and automatic-gain-control (AGC) circuit 14, a video-frequency circuit 15 of one or more stages and which may include apparatus for deriving signals representative of color, and an image-reproducing device 16 of conventional construction and including the usual line-frequency and field-frequency deflection windings 17 and 18, respectively. There is also coupled to the output terminals of the intermediate-frequency amplifier 13 a conventional sound-signal reproducing unit 19 which comprises the usual frequency detector, amplifiers and sound-reproducing device.

An output circuit of the detector 14 is coupled to input circuits of a line-frequency generator 20 and a potential wave-generating system 21 having input terminals 40, 40 through a synchronizing-signal separator 22. The generating system 21 is, specifically, a field-frequency generator in accordance with the present invention and will be described more fully hereinafter. The output circuits of the units 20 and 21 are coupled in a conventional manner through line-frequency and field-frequency amplifiers 23 and 24, respectively, to the line deflection and field deflection windings 17 and 18, respectively.

The output circuit of the AGC supply in unit 14 is connected to the input circuits of one or more of the radio-frequency amplifier 11, the oscillator-modulator 12 and the intermediate-frequency amplifier 13 in a well-known manner.

It will be undestood that the various units thus far described with respect to the receiver of Fig. 1, with the exception of the potential wave-generating system 21, may be of conventional construction and operation so that a detailed description and explanation of the operation thereof are unnecessary herein.

*General operation of Fig. 1 receiver*

Considering briefly now the general operation of the above-described receiver as a whole, television signals of the type previously discussed herein are intercepted in the antenna system 10, 10, are selected and amplified in the radio-frequency amplifier 11 and applied to the oscillator-modulator 12 wherein they are converted into intermediate-frequency signals. The latter, in turn, are selectively amplified in the intermediate-frequency amplifier 13 and applied to the detector 14 where their modulation components including picture signals and synchronizing signals are derived. The picture signals, which may represent a monochrome image or a color image, are translated through the unit 15 and applied to the image-reproducing device 16, specifically, to the intensity control circuit of the picture tube therein to modulate the intensity of the electron beam developed in such tube.

Assuming for the moment that the potential wave-generating system 21 is a conventional field-frequency generator, the synchronizing-signal components derived in the unit 14 are separated from the video-frequency components in the separator 22 and are utilized to synchronize the operation of the line-frequency and field-frequency generators 20 and 21, respectively. These generators develop potentials of saw-tooth wave form having trace and retrace portions, which are properly synchronized with reference to the transmitted television signal and applied through the amplifiers 23 and 24, respectively, to the deflection windings 17 and 18, respectively, thereby to deflect the cathode-ray beam in the picture tube of the unit 16 in two directions normal to each other to develop a rectilinear raster and, in cooperation with the intensity modulation of the beam by the picture signals, to reproduce the image being televised at the transmitter.

The automatic-gain-control or AGC signal derived in the unit 14 is effective to control the amplification of one or more of the units 11–13, inclusive, to maintain the signal input to the detector 14 and to the sound-signal reproducing unit 19 within a relatively narrow range for a wide range of received signal intensities.

The sound-signal modulated wave signal accompanying the desired television signal is also intercepted by the antenna system 10, 10 and after amplification in the unit 11, conversion to an intermediate-frequency signal in the unit 12 and further amplification in the amplifier 13, is applied to the reproducing unit 19. In the unit 19 it is further amplified and its modulation components are derived, the latter components being utilized by a reproducing device to reproduce sound in a conventional manner.

*Description of potential wave-generating system of Fig. 1*

Referring now more particularly to the potential wave-generating system 21 of Fig. 1, this is a system for generating a television scanning potential wave having retrace portions and trace portions long relative to the retrace portions, specifically, a saw-tooth potential wave. The system comprises an energy-storage means including a pair of terminals, specifically, a condenser 30 coupled to a pair of output terminals 55, 55, one terminal of the condenser 30 being directly connected to one of the terminals 55, 55 and through a resistor 31 to the positive terminal of a B potential source and the other terminal of the condenser 30 being connected through a parallel circuit of a condenser 32 and a resistor 33 to the negative terminal of the B potential source and to the other one of the terminals 55, 55. The elements 31–33, inclusive, comprise a charging circuit for periodically supplying energy from the source of B potential to the condenser 30 to develop on one of the terminals of the condenser 30, specifically, on the terminal directly connected to one of the pair of terminals 55, 55 the trace portions of the potential wave. The condenser 32 has a sufficiently large value to maintain the potential thereacross substantially constant over several fields of scan. The other one of the output terminals 55, 55 is connected to the negative terminal of the source of B potential.

The system also comprises a circuit for periodically discharging the condenser 30 to develop on the aforesaid one terminal with respect to the aforesaid other terminal the retrace portions of the saw-tooth potential wave. The latter circuit comprises a blocking oscillator 34 of a conventional type including a triode 35 having the cathode thereof connected to the negative terminal of the B potential source and the anode thereof coupled through the series circuit of a winding 36 of a transformer 37 and the resistor 31 to the positive terminal of the B potential source. The terminals 40, 40 are connected through another winding 39 of the transformer 37 and a coupling condenser 41 to the control electrode-cathode circuit of the tube 35. Parallel-connected resistor 42 and condenser 43 are coupled as a load circuit across the terminals 40, 40 while a biasing resistor network including series-connected resistors 44 and 45 is connected between the control electrode of the tube 35 and the negative terminal of the B potential source. This network together with the condenser 41 normally is effective to bias the control electrode negative with respect to the cathode so that over most of the field-frequency cycle the tube 35 is normally nonconductive. As is conventional in blocking oscillators, the windings 36 and 39 with the inherent and physical capacitance connected in parallel therewith determine what would be the free-running frequency except for the blocking action of the oscillator. This frequency is normally high with respect to the frequency of the saw-tooth wave of the oscillator, approximately one-half cycle of the free-running frequency occurring during the retrace portion of the saw-tooth wave. The values of the condenser 41 and the series-connected resistors 44 and 45 are so proportioned with respect to the normal free-running or sine-wave frequency of the oscillator 34 as to have a time constant which causes a negative bias potential to be developed on the control electrode which interferes with the continuous development of sine-wave signals at the resonant frequency of the windings of the transformer 37. This time constant is slightly greater than the period of the saw-tooth wave developed across the condenser 30.

The signal-generating system also comprises a control circuit 50 for causing the retrace portions of the saw-tooth signal developed across the condenser 30 to be terminated at a constant termination potential. The control circuit 50 includes a source of fixed reference potential substantially equal to the termination potential, specifically, a potential-supply circuit coupled to the energy-storage means and the discharge means for establishing the aforesaid other terminal or lower terminal of the enery-storage means at substantially a predetermined potential level. More specifically, the control circuit includes a voltage-divider network including a resistor 51 and the resistor 33 connected in series across the source of B potential, the condenser 32 being connected in parallel with the resistor 33, as previously described herein, so as to have a potential thereacross equal to the potential across the resistor 33. One terminal of the energy-storage condenser 30 is connected to the high-potential junction of the resistor 33 and the condenser 32. The relative values of the resistors 33 and 51 are determined by the potential desired across the condenser 32. In the embodiment under consideration, though the inventor does not wish to be limited thereto, the resistors 33 and 51 are so proportioned that 50 volts are developed across the resistor 33 and the condenser 32. The control circuit 50 also includes a unidirectionally conductive device, specifically, a diode 52 coupled between the source of fixed reference potential and a terminal of the energy-storage means for preventing the termination potential on the one terminal from decreasing below the fixed potential. Specifically, the device is coupled in parallel with the condenser 30 to the two terminals thereof for maintaining, at the termination of the retrace portions of the saw-tooth potential wave developed across the condenser 30, the other portion or terminal of the condenser 30 at substantially the predetermined potential level established across the condenser 32. The diode 52 is so poled as to be conductive whenever the condenser 30 tends to be discharged below the predetermined potential level. Specifically, the cathode of the diode is connected to the junction of the condenser 30 and the resistor 31 while the anode thereof is connected to the other terminal of the condenser 30.

*Explanation of operation of potential wave-generating system of Fig. 1*

Considering now the operation of the saw-tooth potential wave-generating system 21 of Fig. 1, it is to be understood that, except for the operation of the diode 52, the condenser 32, and the resistors 33 and 51, the system 21 operates as a conventional blocking oscillator, the frequency of which is controlled by positive-going synchronizing pulses applied to the terminals 40, 40. The operation of this conventional portion of the circuit will be described briefly, prior to a consideration of the improved system as a whole.

A blocking oscillator is a modified type of sine-wave oscillator in which instead of a continuous train of sine waves, there is developed a series of pulses each corresponding to approximately one-half cycle of a sine wave developed when the tube of the oscillator conducts, these half cycles being separated by periods during which the tube does not conduct. The repetition frequency of these pulses is determined primarily by the values of the condenser 41 and the resistors 44 and 45 and also by the repetition rate of the synchronizing pulses applied through the condenser 41 to the control electrode of the tube 35. Briefly, a short time after the circuit has been energized by the operating potentials, the tube 35 becomes nonconductive due to the negative bias developed by the signal fed back through the transformer 37 to the control electrode of the tube 35. As mentioned previously, this nonconductive period is determined by the decay time of the circuit including the condenser 41 and the resistors 44 and 45 and the repetition rate of the synchronizing pulses. While the tube is nonconductive current effectively flows through the resistors 31 and 33 from the source of B potential to the condenser 30 gradually increasing the potential across this condenser approximately to the potential +B. This gradual increase in potential across the condenser 30 forms the trace portion of the saw-tooth potential wave. At some time during the trace portion, a positive-going synchronizing pulse is translated through the condenser 41 and applied to the control electrode of the tube 35 to cause this tube to become conductive and develop a pulse of current flowing therethrough. As soon as the tube 35 is rendered conductive, the condenser 30 is quickly discharged through the tube 35 to develop the retrace portion of the saw-tooth potential wave. At the termination of the applied pulse, the feed-back action of the transformer 37 again causes the control electrode of the tube 35 to be biased negatively with respect to the anode-cathode thereof causing the tube 35 again to become nonconductive and to repeat the cycle just described. In this way a succession of saw-tooth potential waves at the repetition rate of the field-synchronizing pulses which is 60 per second, or in other words, at field frequency, are developed across the condenser 30 and applied through the terminals 55, 55 and the field-frequency amplifier 24 to the field deflection winding 18 of the image-reproducing device 16.

The above-described operation of the system 21 neglects the effect of variations in the conduction characteristic of the tube 35 causing variations in the amplitude of the retrace portion of the saw-tooth signal developed across the condenser 30. Referring now to the graphs of Figs. 2*a* and 2*b* representing the wave forms of potentials developed at different points in the generating system 21, curve A represents in idealized form a pulse of anode-cathode current in the tube 35 upon application of a positive-going synchronizing pulse of preferred form to the control electrode of the tube 35. Such a current pulse under normal operating conditions is effective to develop a saw-tooth potential wave such as represented by curve B and having a retrace portion $B_R$ initiated at the time $t_1$ and terminating at the time $t_3$ and a trace portion $B_T$. In order to effect proper interlacing, as previously described herein, the trace portion $B_T$ should be initiated at the potential level L and at a time corresponding to the time $t_3$ for each field being traced. The anode-cathode current pulse flowing in the tube 35 can vary in energy, specifically, in intensity while the duration of the pulse is proper, in duration while the intensity is proper or in both intensity and duration. These variations may result from a number of factors, for example, from variations in the energy of the synchronizing pulses, noise accompanying the synchronizing pulses or energy fed from the line-frequency circuit into the field-frequency circuit during field retrace. If the synchronizing pulse effectively varies in amplitude so that a relatively large current pulse, as represented by curve C, is developed in the output circuit of the tube 35, the slope of the retrace portion of the saw-tooth wave is changed due to the increased energy in the pulse represented by the curve C and a saw-tooth wave such as is represented by curve D and having a retrace portion $D_R$ starting at time $t_1$ and terminating at time $t_3$ and a trace portion $D_T$ is developed. Since the pulse represented by curve C has the same duration as the pulse represented by curve A, the retrace portion $D_R$ is terminated at the time $t_3$. However, due to the increased current in the pulse represented by curve C causing a change in the slope of the retrace as represented by the portion $D_R$, the retrace portion $D_R$ terminates at a level $L_1$ which is different from the preferred level L. Thus, the trace portion $D_T$ is initiated at a level $L_1$ and will cause a field to be traced which is not properly related spatially on the image screen of the picture tube with the preceding and succeeding fields. It is possible that instead of having interlaced fields, variations in the energy content of the anode-cathode current pulses in the tube 35 may cause complete loss of interlacing. This effect is represented by the patterns of Figs. 3*a* and 3*b*, these patterns representing the paths of the electron beam on the image screen for perfect interlacing of fields in an odd-line interlace system, as represented by Fig. 3*a*, and for imperfect interlacing in such system, as represented by Fig. 3*b*. For simplicity, only fragmentary portions of the patterns traced by the beam are represented.

In Fig. 3*a* the solid horizontal lines are traced by the electron beam during one field of scan, arbitrarily considered to be the first or an odd-numbered field, and the dashed lines are traced during the succeeding field, arbitrarily considered to be field number two or an even-numbered field. The vertical and diagonal lines in the pattern represent the retraces of the beam during the vertical blanking intervals of the scanning cycle. It is apparent that field number two is traced in a properly interlaced manner with respect to field number one to obtain all the benefits of interlacing. Fig. 3*b* represents to an enlarged vertical scale only that portion of a pattern such as represented by Fig. 3*a* which is included between the first two lines of field number one. When a line traced during field number two coincides with the line X, then field number two is properly interlaced with field number one. If, however, because of changes in the amplitude of the retrace portion of the field-frequency saw-tooth potential, a line traced during the second field coincides with either of the lines Y or Z or is displaced to any large degree from coincidence with the line X, then the fields are not properly interlaced and the benefits of interlacing are lost. In fact, if the relative positions of the fields one and two vary from the frame to frame, the effects of flicker and distortion may be worse than if no interlacing is attempted. Referring now to Fig. 2*a*, the vertical displacement of the trace portion $D_T$ of the saw-tooth wave represented by the curve D with respect to the proper portion thereof as represented by the trace portion $B_T$ of the wave represented by the curve B will cause the second field to have a line of trace substantially coinciding with the line Y of Fig. 3*b*.

As previously mentioned, the changes in the amplitude of the retrace portion of the field-frequency saw-tooth wave may be effected by other than changes in the amplitude of the anode-cathode current pulse in the tube 35 as represented by curve C with relation to curve A. A current pulse of excessive duration as represented by curve J of Fig. 2*a* or of too little duration as represented by curve H will cause saw-tooth waves such as represented by curves F and G, respectively, to be developed, these waves having trace portions $F_T$ and $G_T$, respectively, and retrace portions $F_R$ and $G_R$, respectively. The retrace portion $F_R$ is initiated at the time $t_1$ and terminates at the time $t_4$ while the retrace portion $G_R$ is initiated at the time $t_1$ and terminates at the time $t_2$. Though portions of the retrace portions $F_R$ and $G_R$ coincide with each other and with at least a portion of retrace portion $B_R$ of the potential wave represented by curve B, it is apparent that the retrace portions $B_R$, $F_R$ and $G_R$ are of different amplitudes. Therefore, the trace portions $F_T$ and $G_T$ resulting from the retrace portions $F_R$ and $G_R$, respectively, are improperly positioned with respect to the properly developed trace portion $B_T$ of the wave represented by curve B. It is apparent that the trace portions $B_T$, $G_T$, $F_T$ and $D_T$ should substantially coincide and should not be displaced vertically as represented, if proper interlacing of the fields being scanned is to be obtained. The amount of displacement of these trace porions is an indication of improper tracing of the electron beam and, therefore, of improper interlacing of the fields being scanned.

To correct this improper tracing, the control circuit 50 is included in the system 21 to effect termination of the retrace portion of the saw-tooth potential waves at a constant level, in other words, to limit the minimum potential to which the condenser 30 can be discharged so that all retrace portions, regardless of the variations in the above-discussed current pulses, are of substantially constant amplitude. This minimum potential is represented as the level $E^+$ in both Figs. 2*a* and 2*b* and is selected as will be described more fully hereinafter. Referrin to Fig. 2*b*, prior to considering the manner in which the curves represented thereby are developed in the improved generating system in accordance with the present invention, the effect of maintaining such retrace portions at substantially constant amplitude by terminating the retrace portions at the potential level $E^+$ is apparent from the relative positioning of the trace portions $G_T'$, $B_T'$, $D_T'$ and $F_T'$ corresponding to similarly lettered trace portions previously described herein. All retrace portions terminate the level $E^+$ and all trace portions are initiated from the level $E^+$ at the times the retrace portions corresponding thereto would have normally terminated. Thus, the trace portion $G_T'$ is initiated at the time $t_2$, the trace portions $B_T'$ and $D_T'$ coincide, being initiated at the $t_3$, and the trace portion $F_T'$ is initiated at the time $t_4$. It is apparent that the trace portions $B_T'$ and $D_T'$ coincide and the trace portions $G_T'$ and $F_T'$ nearly coincide therewith, being displaced vertically therefrom by small amounts compared to the vertical displacements of the trace portions $G_T$, $B_T$, $F_T$ and $D_T$ of Fig. 2*a*.

Considering now the operation of the control circuit 50 to develop the curves of Fig. 2*b*, the control of the amplitude of the retrace portions of the saw-tooth potential waves is effected by establishing one terminal of the condenser 30 of Fig. 1 at a predetermined potential level $E^+$, for example, 50 volts with respect to the cathode of the tube 35, thereby causing the anode of the diode 52 to be positive with respect to the potential $-B$. Consequently, if during the retrace portion of a saw-tooth wave there is a tendency to discharge the condenser 30 below the level of 50 volts, as there might be due to variations in the operating conditions of the discharge circuit including the tube 35 for any of the reasons previously discussed herein or for other reasons producing similar effects, for example, due to variations in the current pulses translated through the tube 35, the cathode of the diode 52 tends to become negative with respect to the anode thereof and the diode conducts. This flow of current through the diode 52 immediately limits the lower potential of the retrace portion of the signal to the fixed reference potential $E^+$, for example, to approximately 50 volts as represented by Fig. 2*b*. Thus, regardless of the amplitude or duration of the current pulse developed by the applied synchronizing pulse and resulting in variations in the conductance characteristic of the circuit including the tube 35, the retrace portion of the saw-tooth potential wave will not cause the condenser 30 to be discharged to a level less than the reference level $E^+$ and the amplitude of the retrace portion of the potential wave is maintained constant to effect improved interlacing of the fields being scanned.

It is apparent from the curves of Figs. 2*a* and 2*b* that, if the selected reference amplitude $E^+$ for the termination of the retrace portion of the field-frequency saw-tooth wave corresponds to the retrace portion $B_R$ developed by the normal current pulse represented by curve A, then a pulse of shorter duration, such as represented by curve H, develops a retrace portion $G_R$ of smaller amplitude than the portion $B_R$ and the trace $G_T$ is displaced with respect to the proper trace $B_T$. In order to correct for such short duration pulses, the amplitude of the retrace portion is arbitrarily limited to an amplitude somewhat less than that normally developed by a correct synchronizing pulse. In this manner, compensation may be made for current pulses of short duration or low energy content as well as for other pulses.

In addition to compensating for variations in the amplitude of the retrace portion of the field-frequency saw-tooth wave, the development of a fixed positive biasing potential for the condenser 30 has other beneficial effects. If this refence potential is of sufficient magnitude so that the rate of change of the slope of the retrace portion is high at the reference potential, in other words, if the first derivative of the retrace slope is still of large magnitude at the reference potential, then the retrace portion of the potential wave will have substantially a linear slope and produce a rapid rate of discharge of the condenser 30 up to the termination of the retrace. By maintaining a limiting voltage of the magnitude just described, a low-impedance discharge path through the tube 35 is maintained throughout the retrace and the termination points of the retrace portions are more accurately defined for each retrace.

*Description and explanation of operation of potential wave-generating system of Fig. 4*

There has been described with reference to the system 21 of Fig. 1 a source of fixed reference potential which is effectively a voltage-divider circuit across the B potential source of power. In some potential wave-generating systems utilization of such a voltage-divider network may be inefficient since it may dissipate an undesired amount of energy. A source of fixed reference potential of the type represented in the system of Fig. 4 may be preferable.

Since the system of Fig. 4 is related to the system of Fig. 1, elements in the system of Fig. 4 which correspond to elements of Fig. 1 are designated by the same reference numerals and elements analogous to elements of Fig. 1 by the same reference numerals with a prefix of 4. The system of Fig. 4 differs from the system of Fig. 1 in that the negative terminal of the B potential source is not connected to the chassis ground of the television receiver but is at a potential below ground. In other words, potentials both positive and negative with respect to the common ground for the receiver and for the generating system are developed from the main power source. The cathode of the tube 35 is connected to this negative terminal while the parallel-connected resistor 433 and condenser 432 are connected between this negative terminal and chassis ground. Thus, in the system 421 of Fig. 4 chassis ground is at the fixed reference potential for the condenser 30 and the results described with reference to the system of Fig. 1 are obtained because the cathode of the tube 35 is coupled to a potential negative with respect to ground. The potential across the circuit of the resistor 433 and the condenser 432 may be, for example, the fixed reference potential of 50 volts described with respect to the system 21 of Fig. 1.

Except insofar as the relocations of the operating potentials with respect to chassis ground affect the senses with respect to chassis ground of the currents flowing in the charging and discharging circuits the potential wave-generating system of Fig. 4 operates in the same manner as the system of Fig. 1 and effects similar results.

*Description of system of Fig. 5*

The potential wave-generating systems described with reference to Figs. 1 and 4 have included conventional blocking oscillators. The improved potential wave-generating system in accordance with the present invention is not limited to the utilization of a blocking oscillator but may include a multivibrator such as is represented in the system of Fig. 5. Since the systems of Fig. 1 and Fig. 5 are similar, elements in the system of Fig. 5 which correspond to elements of Fig. 1 are designated by the same reference numerals while elements analogous to elements of Fig. 1 are designated by the same reference numerals with a prefix of 5.

The system of Fig. 5 comprises a conventional cathode-coupled multivibrator 70 including triodes 71 and 72. Multivibrators are well-known devices comprising basically two resistor-condenser coupled amplifiers interconnected so that the output circuit of one amplifier is connected to the input circuit of the second amplifier and the output circuit of the second amplifier is connected to the input circuit of the first amplifier. The amplifier including the tube 72 comprises an output circuit including a resistor 73 coupled between the anode of the tube 72 and a source of potential +B, this output circuit being coupled through a condenser 74 to the control electrode of the tube 71 in the second amplifier. A resistor 75 connected between the control electrode of the tube 71 and the negative terminal of the source of B potential in cooperation with the condenser 74 provides a biasing circuit for the control electrode of the tube 71. The second amplifier including the tube 71 includes two output circuits one of which comprises a resistor 76 coupled between the cathodes of the tubes 71 and 72 and the negative terminal of the B potential source. The resistor 76 also comprises an input circuit through the cathode of the tube 72 to the amplifier including the tube 72. The other output circuit of the tube 71 comprises an anode load resistor 77 coupled between the anode of the tube 71 and the source of potential +B, the junction of the anode of the tube 71 and the resistor 77 being connected to the condenser 30, the cathode of the diode 52 and one of the terminals 55, 55. The input circuit for synchronizing the operation of the multivibrator 70 comprises the control electrode-cathode circuit of the tube 72 coupled through an amplifier 78 to the terminals 40, 40.

*Explanation of operation of system of Fig. 5*

Considering now the operation of the system of Fig. 5, the multivibrator 70 operates in the same manner as do the multivibrators in conventional field-frequency generators. Briefly, the application of a positive-going synchronizing pulse to the terminals 40, 40 should occur at a time when the tube 72 is conductive and the tube 71 is nonconductive. The positive-going pulse is inverted by translation through the amplifier 78 to become a negative-going pulse which is applied to the control electrode of the tube 72 causing the latter tube to become nonconductive and the tube 71 to become conductive in the manner of a conventional multivibrator. It is during this period that the retrace potential is developed across the condenser 30. The combination of the termination of the negative-going synchronizing pulse and the discharge of the condenser 74 to a low level by the current through the tube 72 and the control-electrode current of the tube 71 causes a negative bias to be developed on the control electrode of the tube 71 to cause the latter tube to become nonconductive and the tube 72 to become conductive. The tube 71 is maintained nonconductive for a relatively long period during which the trace portion of the saw-tooth wave signal is developed across the condenser 30. This period is determined by the time constant of the circuit including the condenser 74 and the resistor 75. As described with respect to the potential wave-generating system of Fig. 1, the period of conduction of the tube 71 may vary depending upon many factors including the period of conduction of the tube 72 and the energy content of the synchronizing pulses applied to the terminals 40, 40. Therefore, the control circuit 50 including the source of fixed reference potenial comprising the elements 32, 33 and 51 and also including the unidirectionally conductive device 52 is coupled to the energy-storage condenser 30 to control the retrace portion of the saw-tooth potential wave developed therein so that such retrace portion is maintained at constant amplitude.

Though the present invention has been described with reference to field-frequency generators of television receivers, it should be understood that the invention is not limited to such generators but may have utility in any potential wave-generating system in which a wave is developed having a relatively long trace portion with respect to the retrace portion thereof and in which it is desired to maintain the amplitude of the retrace portion of the potential wave constant.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for generating a television scanning potential wave having retrace portions and trace portions long relative to said retrace portions comprising: a condenser; a charging circuit including a source of unidirectional potential and a resistor for supplying energy from said source of unidirectional potential and through said resistor to said condenser to develop across said condenser said trace portions of said wave; a circuit including a blocking oscillator for periodically discharging said condenser during the conduction periods of said oscillator to develop across said condenser said retrace portions of said wave, the amplitudes of said retrace portions tending to vary with variations in the operating conditions of said oscillator; and a control circuit for causing said retrace portions to be terminated at a constant termination potential including a source of fixed reference potential substantially equal to said termination potential coupled between one terminal of said condenser and said discharge circuit for establishing said one terminal of said condenser at substantially said fixed reference potential and including a diode coupled in parallel with said condenser for preventing said termination potential on said other terminal of said condenser from decreasing below said fixed potential.

2. A system for generating a television scanning potential wave having retrace portions and trace portions long relative to said retrace portions comprising: energy-storage means including a pair of terminals; a charging circuit for supplying energy to said storage means to develop on one of said terminals with respect to the other thereof said trace portions of said wave; a circuit for periodically discharging said storage means to develop on said one terminal with respect to said other terminal said retrace portions of said wave, the amplitudes of said retrace portions tending to vary with variations in the operating conditions of said discharge circuit; and a control circuit for causing said retrace portions to be terminated at a constant termination potential including a source of fixed reference potential substantially equal to said termination potential and a unidirectionally conductive device coupled between said source and said one terminal of said energy-storage means for preventing said termination potential on said one terminal from decreasing below said fixed potential.

3. A system for generating a television scanning potential wave having retrace portions and trace portions long relative to said retrace portions comprising: a condenser including a pair of terminals; a charging circuit for supplying energy to said condenser to develop on one of said terminals with respect to the other thereof said trace portions of said wave; a circuit for periodically discharging said condenser to develop on said one terminal with respect to said other terminal said retrace portions of said wave, the amplitudes of said retrace portions tending to vary with variations in the operating conditions of said discharge circuit; and a control circuit for causing said retrace portions to be terminated at a constant termination potential including a source of fixed reference potential substantially equal to said termination potential and a unidirectionally conductive device coupled between said source and said one terminal of said condenser for preventing said termination potential on said one terminal from decreasing below said fixed potential.

4. A system for generating a television scanning potential wave having retrace portions and trace portions long relative to said retrace portions comprising: energy-storage means including a pair of terminals; a charging circuit for supplying energy to said storage means to develop on one of said terminals with respect to the other thereof said trace portions of said wave; a circuit for periodically discharging said storage means to develop on said one terminal with respect to said other terminal said retrace portions of said wave and including an electron-discharge device which is periodically conductive, the amplitudes of said retrace portions tending to vary with variations in the conduction of said device; and a control circuit for causing said retrace portions to be terminated at a constant termination potential including a source of fixed reference potential substantially equal to said termination potential and a unidirectionally conductive device coupled between said source and said one terminal of said energy-storage means for preventing said termination potential on said one terminal from decreasing below said fixed potential.

5. A system for generating a television scanning potential wave having retrace portions and trace portions long relative to said retrace portions comprising: energy-storage means including a pair of terminals; a charging circuit including a resistor and a source of potential for supplying energy from said source of potential and through said resistor to said storage means to develop on one of said terminals with respect to the other thereof said trace portions of said wave; a circuit for periodically discharging said storage means to develop on said one terminal with respect to said other terminal said retrace portions of said wave, the amplitudes of said retrace portions tending to vary with variations in the operating conditions of said discharge circuit; and a control circuit for causing said retrace portions to be terminated at a constant termination potential including a source of fixed reference potential substantially equal to said termination potential and a unidirectionally conductive device coupled between said source and said one terminal of said energy-storage means for preventing said termination potential on said one terminal from decreasing below said fixed potential.

6. A system for generating a television scanning potential wave having retrace portions and trace portions long relative to said retrace portions comprising: energy-storage means including a pair of terminals; a charging circuit for supplying energy to said storage means to develop on one of said terminals with respect to the other thereof said trace portions of said wave; a circuit for periodically discharging said storage means to develop on said one terminal with respect to said other terminal said retrace portions of said wave, the amplitudes of said retrace portions tending to vary with variations in the operating conditions of said discharge circuit; and a control circuit for causing said retrace portions to be terminated at a constant termination potential including a source of fixed reference potential substantially equal to said termination potential coupled to said other terminal of said storage means and a unidirectionally conductive device coupled between said source and said one terminal of said energy-stored means for preventing said termination potential on said one terminal from decreasing below said fixed potential.

7. A system for generating a television scanning potential wave having a period related to the period of synchronizing pulses applied to the system and having retrace portions and trace portions long relative to said retrace portions comprising: energy-storage means including a pair of terminals; a charging circuit for supplying energy to said storage means to develop on one of said terminals with respect to the other thereof said trace portions of said wave; a circuit for periodically discharging said storage means to develop on said one terminal with respect to said other terminal said retrace portions of said wave, the amplitudes of said retrace portions tending to vary with variations in the energy content of individual ones of said synchronizing pulses; and a control circuit for causing said retrace portions to be terminated at a constant termination potential including a source of fixed reference potential substantially equal to said termination potential and a unidirectionally conductive device coupled between said source and said one terminal of said energy-storage means for preventing said termination potential on said one terminal from decreasing below said fixed potential.

8. A system for generating a television scanning potential wave having a period related to the period of synchronizing pulses applied to the system and having retrace portions and trace portions long relative to said retrace portions comprising; energy-storing means including a pair of terminals; a charging circuit for supplying energy to said storage means to develop on one of said terminals with respect to the other thereof said trace portions of said wave; a circuit for periodically discharging said storage means to develop on said one terminal with respect to said other terminal said retrace portions of said wave, the amplitudes of said retrace portions tending to vary with variations in the amplitude of individual ones of said synchronizing pulses; and a control circuit for causing said retrace portions to be terminated at a constant termination potential including a source of fixed reference potential substantially equal to said termination potential and a unidirectionally conductive device coupled between said source and said one terminal of said energy-storage means for preventing said termination potential on said one terminal from decreasing below said fixed potential.

9. A system for generating a television scanning potential wave having a period related to the period of synchronizing pulses applied to the system and having retrace portions and trace portions long relative to said retrace portions comprising: energy-storage means including a pair of terminals; a charging circuit for supplying energy to said storage means to develop on one of said terminals with respect to the other thereof said trace portions of said wave; a circuit for periodically discharging said storage means to develop on said one terminal with respect to said other terminal said retrace portions of said wave, the amplitudes of said retrace portions tending to vary with variations in the duration of individual ones of said synchronizing pulses; and a control circuit for causing said retrace portions to be terminated at a constant termination potential including a source of fixed reference potential substantially equal to said termination potential and a unidirectionally conductive device coupled between said source and said one terminal of said energy-storage means for preventing said termination potential on said one terminal from decreasing below said fixed potential.

10. A system for generating a television scanning potential wave having retrace portions and trace portions long relative to said retrace portions comprising: energy-storage means including a pair of terminals; a charging circuit for supplying energy to said storage means to develop on one of said terminals with respect to the other thereof said trace portions of said wave; a circuit for periodically discharging said storage means to develop on said one terminal with respect to said other terminal said retrace portions of said wave, the amplitudes of said retrace portions tending to vary with variations in the operating conditions of said discharge circuit; and a control circuit for causing said retrace portions to be terminated at a constant termination potential including a source of fixed reference potential substantially equal to said termination potential and a unidirectionally conductive device coupled between said source and said one terminal of said storage means, said device being so poled as to be conductive whenever said storage means tends to be discharged below said constant termination potential, thereby to prevent the magnitude of said termination potential on said one terminal from decreasing below said fixed potential and to maintain the magnitudes of said retrace portions substantially constant.

11. A system for generating a television scanning potential wave having retrace portions and trace portions long relative to said retrace portions comprising: energy-storage means including a pair of terminals; a charging circuit for supplying energy to said storage means to develop on one of said teminals with respect to the other thereof said trace portions of said wave; a circuit for periodically discharging said storage means to develop on said one terminal with respect to said other terminal said retrace portions of said wave, the amplitudes of said retrace portions tending to vary with variations in the operating conditions of said discharge circuit; and a control circuit for causing said retrace portions to be terminated at a constant termination potential including a source of fixed reference potential substantially equal to said termination potential and a diode coupled between said source and said one terminal of said storage means, said diode being so poled as to be conductive whenever said storage means tends to be discharged below said constant termination potential, thereby to prevent the magnitude of said termination potential on said one terminal from decreasing below said fixed potential and to maintain the magnitudes of said retrace portions substantially constant.

12. A system for generating a television scanning potential wave having retrace portions and trace portions long relative to said retrace portions comprising: energy-storage means including a pair of terminals; a charging circuit for supplying energy to said storage means to develop on one of said terminals with respect to the other thereof said trace portions of said wave; a circuit for periodically discharging said storage means to develop on said one terminal with respect to the other terminal said retrace portions of said wave, the amplitudes of said retrace portions tending to vary with variations in the operating conditions of said discharge circuit; and a control circuit for causing said retrace portions to be terminated at a constant termination potential including a diode and a voltage divider coupled to said storage means for establishing a potential equal to said termination potential, said diode being coupled between said source and one terminal of said storage means and being so poled as to be conductive whenever said storage means tends to be discharged below said constant termination potential, thereby to maintain the magnitudes of said retrace portions substantially constant.

13. A system for generating a television scanning potential wave having retrace portions and trace portions long relative to said retrace portions comprising: energy-storage means including a pair of terminals; a charging circuit for supplying energy to said storage means to develop on one of said terminals with respect to the other thereof said trace portions of said wave; a circuit for periodically discharging said storage means to develop on said one terminal with respect to said other terminal said retrace portions of said wave, the amplitudes of said retrace portions tending to vary with variations in the operating conditions of said discharge circuit; and a control circuit for causing said retrace portions to be terminated at a constant termination potential including a source of fixed reference potential substantially equal to said termination potential coupled to said storage means and said discharge circuit for establishing said other terminal of said storage means at substantially a constant potential level and including a unidirectionally conductive device coupled to said pair of terminals of said storage means for preventing said termination potential on said one terminal of said energy-storage means from decreasing below said constant potential level.

14. A system for generating a television scanning potential wave having a period related to the period of a synchronizing pulse applied to the system and having retrace portions and trace portions long relative to said retrace portions comprising: energy-storage means including a pair of terminals; a charging circuit for supplying energy to said storage means to develop on one of said terminals with respect to the other thereof said trace portions of said wave; a circuit for periodically discharging said storage means to develop on said one terminal with respect to said other terminal said retrace portions of said wave, the amplitudes of said retrace portions tending to vary with variations in the energy content of said synchronizing pulse; and a control circuit for causing said retrace portions to be terminated at a constant termination potential including a source of fixed reference potential substantially equal to said termination potential coupled to said storage means and said discharge circuit for establishing said other terminal of said storage means at substantially a constant potential level and including a unidirectionally conductive device coupled to said pair of terminals of said storage means for preventing said termination potential on said one terminal of said energy-storage means from decreasing below said constant potential level.

15. A system for generating a television scanning potential wave having retrace portions and trace portions long relative to said retrace portions comprising: energy-storage means including a pair of terminals; a charging circuit including a source of unidirectional potential for supplying energy to said storage means to develop on one of said terminals with respect to the other thereof said trace portions of said wave; a circuit for periodically discharging said storage means to develop on said one terminal with respect to said other terminal said retrace portions of said wave, the amplitudes of said retrace portions tending to vary with variations in the operating conditions of said discharge circuit; and a control circuit for causing said retrace portions to be terminated at a constant termination potential including a resistor network coupled to said source of unidirectional potential, a part of said network being coupled to said storage means and said discharge circuit for establishing said other terminal of said storage means at substantially a predetermined potential level and including a unidirectionally conductive device coupled to said terminals of said storage means for preventing said termination potential on said one terminal of said energy-storage means from decreasing below said constant potential level.

16. A system for generating a television scanning potential wave having retrace portions and trace portions long relative to said retrace portions comprising: energy-storage means including a pair of terminals; a charging circuit for supplying energy to said storage means to develop on one of said terminals with respect to the other thereof said trace portions of said wave; a circuit for periodically discharging said storage means to develop on said one terminal with respect to said other terminal said retrace portions of said wave, the amplitudes of said retrace portions tending to vary with variations in the operating conditions of said discharge circuit; and a control circuit for causing said retrace portions to be terminated at a constant termination potential including a source of fixed reference potential substantially equal to said termination potential coupled to said storage means and said discharge circuit for establishing said other terminal of said storage means at substantially a constant potential level and including a unidirectionally conductive device coupled in parallel with said storage means for preventing said termination potential on said one terminal of said energy-storage means from decreasing below said constant potential level.

17. A system for generating a television scanning potential wave having retrace portions and trace portions long relative to said retrace portions comprising: energy-storage means including a pair of terminals; a charging circuit for supplying energy to said storage means to develop on one of said terminals with respect to the other thereof said trace portions of said wave; a circuit including a blocking oscillator for periodically discharging said storage means during the conduction period of said oscillator to develop on said one terminal with respect to said other terminal said retrace portions of said wave, the amplitudes of said retrace portions tending to vary with variations in the operating conditions of said oscillator; and a control circuit for causing said retrace portions to be terminated at a constant termination potential including a source of fixed reference potential substantially equal to said termination potential coupled to said storage means and said discharge circuit for establishing said other terminal of said storage means at substantially a constant potential level and including a unidirectionally conductive device coupled to said pair of terminals of said storage means for preventing said termination potential on said one terminal of said energy-storage means from decreasing below said constant potential level.

18. A system for generating a television scanning potential wave having retrace portions and trace portions long relative to said retrace portions comprising: energy-storage means including a pair of terminals; a charging circuit for supplying energy to said storage means to develop on one of said terminals with respect to the other thereof said trace portions of said wave; a circuit including a multivibrator for periodically discharging said storage means during the conduction period of a part of said multivibrator to develop on said one terminal with respect to said other terminal said retrace portions of said wave, the amplitudes of said retrace portions tending to vary with variations in the operating conditions of said multivibrator; and a control circuit for causing said retrace portions to be terminated at a constant termination potential including a source of fixed reference potential substantially equal to said termination potential coupled to said storage means and said discharge circuit for establishing said other terminal of said storage means at substantially a constant potential level and including a unidirectionally conductive device coupled to said pair of terminals of said storage means for preventing said termination potential on said one terminal of said energy-storage means from decreasing below said constant potential level.

References Cited in the file of this patent

UNITED STATES PATENTS

| | | |
|---|---|---|
| 2,431,037 | Grundmann | Nov. 18, 1947 |
| 2,508,923 | Mautner | May 23, 1950 |
| 2,521,504 | Dome | Sept. 5, 1950 |
| 2,540,820 | Gruen | Feb. 6, 1951 |
| 2,591,249 | Gannaway | Apr. 1, 1952 |